United States Patent [19]
Dove

[11] Patent Number: 5,979,895
[45] Date of Patent: Nov. 9, 1999

[54] METHOD AND APPARATUS FOR ADMINISTERING PSYCHOLOGICAL TESTS

[76] Inventor: Bonnie C. Dove, 1125 Hansford Dr., Concord, N.C. 28027

[21] Appl. No.: 09/020,656

[22] Filed: Feb. 9, 1998

Related U.S. Application Data

[60] Provisional application No. 60/036,950, Feb. 10, 1997.

[51] Int. Cl.[6] ............................... A63F 9/10; G09B 1/02
[52] U.S. Cl. .................... 273/157 R; 434/238; 434/333
[58] Field of Search ........................ 273/157 R, 157 A, 273/153 R, 156, 287; 434/178, 406, 333, 236–238

[56] References Cited

U.S. PATENT DOCUMENTS

| | | | |
|---|---|---|---|
| 650,320 | 5/1900 | Hepfinger | 273/157 R |
| 1,602,356 | 10/1926 | Franz | 273/157 R |
| 2,011,714 | 4/1935 | Friedman | 273/157 R |
| 2,659,163 | 11/1953 | Albee | 273/157 R |
| 3,274,706 | 9/1966 | Friend | 273/157 R |
| 3,438,141 | 4/1969 | Kirksey | 273/157 R |
| 3,811,203 | 5/1974 | Mayfield . | |
| 3,815,920 | 6/1974 | Carter et al. | 273/157 R |
| 3,879,861 | 4/1975 | Grantham . | |
| 4,552,361 | 11/1985 | LaFleur | 273/157 R |
| 4,640,512 | 2/1987 | Burke | 273/157 R |
| 4,811,951 | 3/1989 | Dorsey-Zinn et al. | 273/157 R |
| 5,108,291 | 4/1992 | Kuo | 273/157 R |
| 5,213,507 | 5/1993 | Ozrovitz | 273/157 R |
| 5,219,168 | 6/1993 | Morris | 273/157 R |
| 5,387,107 | 2/1995 | Gunter et al. . | |
| 5,445,251 | 8/1995 | Redwood . | |
| 5,820,383 | 10/1998 | Levins | 273/157 R |

*Primary Examiner*—Steven Wong
*Attorney, Agent, or Firm*—Alston & Bird LLP

[57] ABSTRACT

There is provided a test administration device having at least three substantially rigid planar members rotatively interconnected. At least two members have a retaining layer on one side containing cut-outs in the general shape of puzzle pieces. The concealed puzzles are successively revealed to the test subject in a random, predetermined arrangement on an integral work surface by selectively rotating the planar members. By vertically rotating the work surface, the pieces of a test puzzle are deposited on the interior surface of the previous planar member for efficient storage. An integral shield for minimizing distractions to the subject is created by positioning a planar member in a generally lower than vertical position. The puzzle pieces of each puzzle are securely stored and concealed between adjacent planar members.

18 Claims, 3 Drawing Sheets

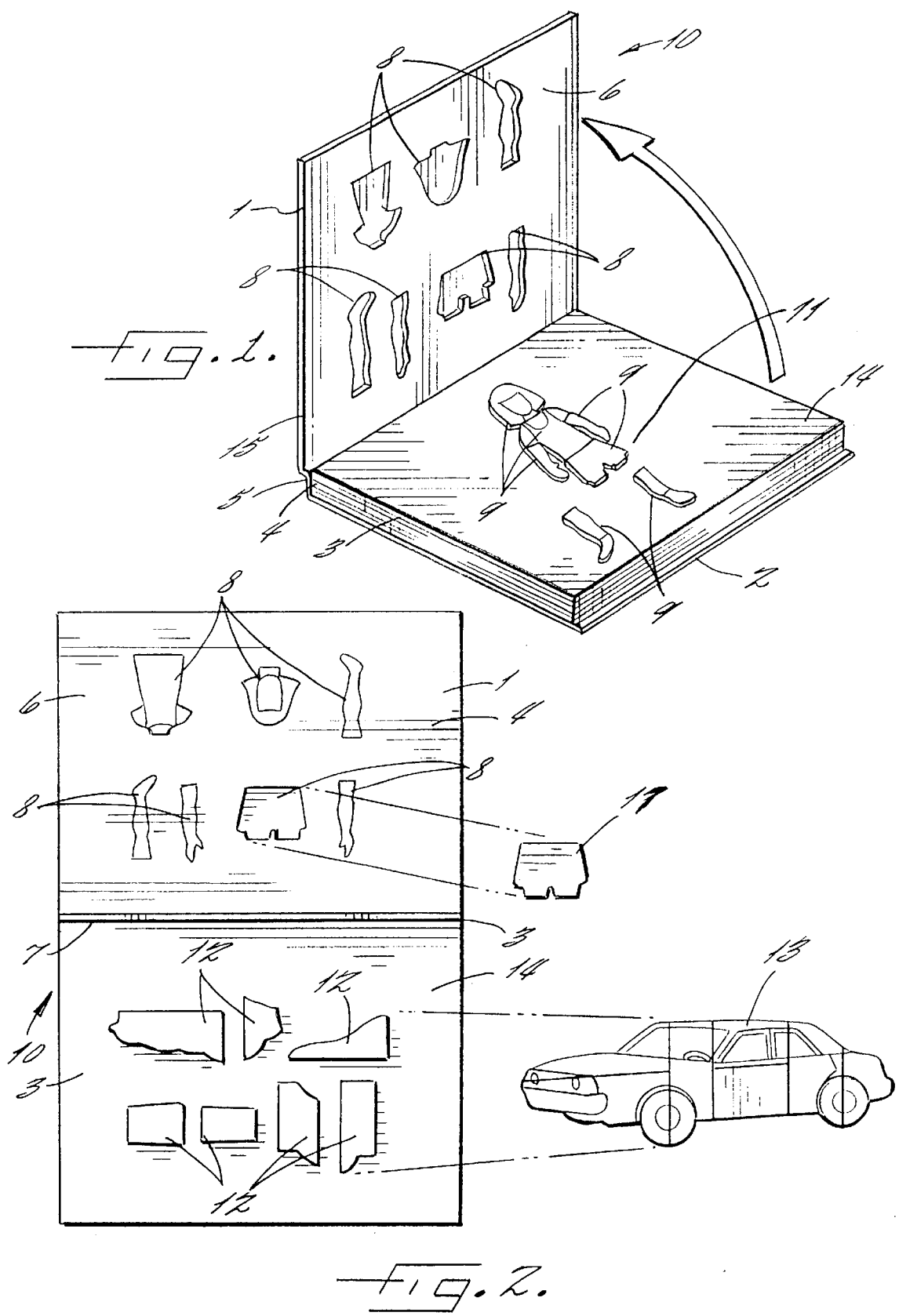

```
┌─ 16
│ POSITIONING THE PSYCHOLOGICAL TEST ADMINISTRATION DEVICE
│ BETWEEN THE TEST SUBJECT AND THE ADMINISTRATOR SUCH THAT THE
│ EXTERIOR SURFACE OF THE COVER IS FACING UPWARDS AND THE
│ FLEXIBLE BINDER IS FACING THE ADMINISTRATOR.
└─
     ▼
┌─ 17
│ ROTATING THE COVER VERTICALLY TOWARD THE ADMINISTRATOR SUCH
│ THAT THE PUZZLE PIECES DISLODGE FROM THE CORRESPONDING
│ CUT-OUTS IN THE INTERIOR SURFACE OF THE COVER AND REMAIN ON THE
│ EXTERIOR SURFACE OF THE NEXT PLANAR MEMBER.
└─
     ▼
┌─ 18
│ ROTATING THE COVER TO A GENERALLY LOWER THAN VERTICAL
│ POSITION TO CREATE A ROTATABLE SHIELD THAT IS INTEGRAL WITH THE
│ TEST ADMINISTRATION DEVICE.
└─
     ▼
┌─ 19
│ TIMING THE SUBJECT WHILE THE SUBJECT WORKS THE PUZZLE
└─
     ▼
┌─ 20
│ LOWERING THE COVER FROM THE VERTICAL POSITION TO A HORIZONTAL
│ POSITION.
└─
     ▼
┌─ 21
│ ROTATING THE ADJACENT INTERMEDIATE PLANAR MEMBER AWAY FROM
│ THE SUBJECT TO A GENERALLY VERTICALLY POSITION THEREBY
│ PRESENTING THE TEST SUBJECT WITH THE SECOND PUZZLE AND
│ ALLOWING THE PIECES OF THE FIRST PUZZLE TO SLIDE DOWN THE
│ EXTERIOR SURFACE OF THE VERTICALLY POSITIONED INTERMEDIATE
│ PLANAR MEMBER AND COLLECT ON THE INTERIOR SURFACE OF THE
│ COVER.
└─
     ▼
┌─ 22
│ REPLACING THE PIECES OF THE FIRST PUZZLE IN THE CORRESPONDING
│ CUT-OUTS IN THE INTERIOR SURFACE OF THE COVER WHILE MAINTAINING
│ THE VERTICAL POSITION OF THE INTERMEDIATE PLANAR MEMBER TO
│ MINIMIZE DISTRACTIONS TO THE TEST SUBJECT.
└─
     ▼
TO FIGURE 3B
```

FIGURE 3A

METHOD AND APPARATUS FOR ADMINISTERING PSYCHOLOGICAL TESTS

This application claims benefit of Provisional Appln. Ser. No. 60/036,950 filed Feb. 10, 1997.

FIELD OF THE INVENTION

The present invention relates to a method and apparatus for administering psychological tests. More particularly, the present invention relates to a psychological testing aid that allows for the efficient and secure storage of test puzzle pieces for later presentment to a subject in a predetermined random arrangement.

BACKGROUND OF THE INVENTION

Psychological tests incorporating one or more puzzles representing recognizable objects or geometries are commonly utilized to measure the intelligence or to ascertain the personality traits of a test subject. Examples of these types of psychological tests include the Object Assembly Subtest of the Weschsler Intelligence Scale for Children, the Weschsler Adult Intelligence Scale, and the Weschsler Preschool and Primary School Scale of Intelligence.

To administer a psychological test of this type, the test subject is presented with the puzzles sequentially and given a predetermined amount of time in which to work each puzzle. Typically, the test administrator manually arranges the puzzle pieces in a predetermined random arrangement on a work surface in front of the test subject. A shield is used by the administrator when arranging the puzzle pieces to prevent the test subject from viewing the pieces prior to administration of the test. Once the time period for completing the puzzle has expired, the administrator must remove and store the puzzle pieces before presenting the test subject with the next puzzle. The manual arrangement, removal, and storage of the puzzle pieces is both cumbersome and time consuming. Further, the resulting time delays and excessive movements by the test administrator can be distracting to the test subject and may adversely affect the subject's performance.

Additionally, to assure uniform testing, the test administrator is required to present each test subject with the puzzle pieces in substantially the same arrangement as the pieces are presented to other test subjects. Any variance in arranging the puzzle pieces among test subjects can affect the accuracy of the test results as one arrangement may take longer to complete than another. Under the conventional testing method, however, it is virtually impossible for the test administrator to manually arrange the puzzle pieces in exactly the same arrangement each time.

In seeking better methods to administer psychological tests, testing aids having cut-outs for the individual puzzle pieces have been proposed. One such example is described in U.S. Pat. No. 3,438,141 to Kirksey, which discloses a compartmentalized board for storing a single puzzle subtest. In the Kirksey patent, a board is disclosed having a front face that is picture framed by a raised peripheral border. Recessed within the border, there is provided a center layer having a plurality of cut-outs in the shape of puzzle pieces for storing the pieces of a single puzzle subtest. Between the center layer and the raised peripheral border is a slidable cover that restrains the puzzle pieces in the cut-outs.

To administer a test using the compartmentalized board, the examiner positions the board in front of the test subject with the raised peripheral border in contact with the work surface. The examiner releases the puzzle pieces by withdrawing the cover, thus allowing the puzzle pieces contained within the cut-outs to fall to, and eventually come to rest on the underlying table surface. The board is used as a shield to prevent the test subject from viewing the puzzle until the appropriate time. Once the test is completed, the administrator replaces the board over the puzzle pieces so that the pieces are retained within the raised peripheral border and then slides the board and the completed puzzle out of the way. To administer two or more puzzle subtests, the test administrator must utilize a board for each puzzle subtest. Also, since the test puzzles are not stored during the administration of the test, but instead are merely slid out of the way using the board as a retaining device, the administrator must have a work surface large enough to receive multiple boards lying adjacent to one another.

Thus, there remains a need for psychological testing aids that allow for the efficient arrangement, removal, and storage of psychological test puzzles. The testing aid must minimize distraction to the test subject and allow the examiner to arrange the puzzle pieces in the same predetermined random arrangement for each test.

SUMMARY OF THE INVENTION

Therefore, it is an object of the present invention to provide a psychological test administration device capable of being used to present a plurality of puzzles sequentially to a subject.

Another object of the present invention is to provide a psychological test administration device capable of being used to present a subject with puzzle pieces in a random, predetermined arrangement that is substantially the same for all subjects tested.

Another object of the present invention is to provide a psychological test administration device in which a completed puzzle may be efficiently removed and stored with minimal distraction to the test subject.

Another object of the present invention is to provide a psychological test administration device capable of securely storing the pieces of a plurality of puzzles for later presentment.

Another object of this invention is to provide a psychological test administration device capable of concealing a plurality of puzzles from a test subject.

A further object of the present invention is to provide a psychological test administration device in which each puzzle is provided with an integral, rotatable shield for concealing the puzzle and for minimizing distractions to the test subject.

Yet another object of the present invention is to provide a psychological test administration device in which each puzzle is provided with an integral work surface.

It has been found that the foregoing objects are accomplished in accordance with this invention by providing at least three planar members of a substantially rigid material with at least two planar members having attached on one side a thin layer of durable, yet cutable, material. The members are juxtaposed and rotatively interconnected on one common side. Cut-outs in the general shape of individual puzzle pieces are formed in the durable layer in a random, yet predetermined arrangement. The pieces are placed within their corresponding cut-outs and securely stored between adjacent planar members for later presentment to a test subject.

To administer a psychological test, the test administration device is positioned between the subject and the administrator. The administrator reveals each puzzle sequentially by rotating the planar members vertically, away from the subject, thereby presenting the subject with the pieces on an integral work surface provided by the exterior surface of the adjacent planar member. Since the cut-outs containing the puzzle pieces are directly adjacent to the exterior surface of the adjacent planar member, each subject is assured of being presented with the pieces oriented in exactly the same arrangement on the work surface.

When the puzzle subtest is completed, the administrator then reveals a new puzzle by rotating the next planar member vertically away from the subject. In exposing the next puzzle, the previously tested puzzle slides down the exterior surface of the next planar member to the interior surface of the previous planar member. The interior surface of the previous planar member conveniently contains the cut-outs for the puzzle pieces. By positioning the next planar member vertically to create a shield, the administrator can place the pieces in their corresponding cut-outs without distracting the subject. The pieces are then securely stored in their corresponding cut-outs by the pressure created through the overlaying of adjacent planar members. This process is continued until all of the puzzles have been presented to the subject and the puzzle pieces are securely stored.

BRIEF DESCRIPTION OF THE DRAWINGS

Other objects, features and advantages of the invention will become apparent from the following detailed description of the invention when taken in conjunction with the accompanying drawings, in which:

FIG. 1 is an isometric view illustrating the test administration device of the present invention wherein a partially completed puzzle is located on the work surface provided by the exterior surface of an intermediate planar member;

FIG. 2 is a top plan view illustrating the test administration device of the present invention wherein a test puzzle is located on the work surface, an intermediate planar member is in the vertical-shielding position, and the previous puzzle has been deconstructed and stored in the cut-outs contained in the interior surface of the cover; and FIGS. 3A–3B is a flow chart showing the steps for administering multiple psychological test puzzles.

DETAILED DESCRIPTION OF THE PREFERRED EMBODIMENTS

Figure 3B:
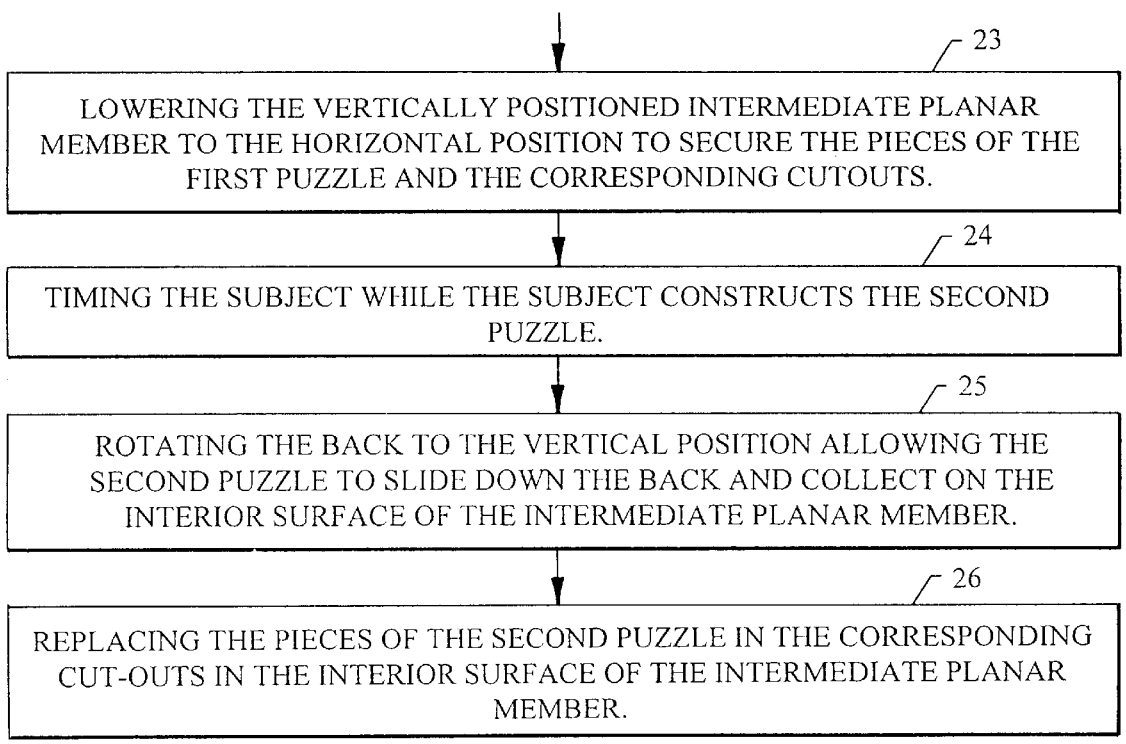

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to the drawings and in particular FIGS. 1 and 2, there is shown a test administration device 10 made in accordance with the present invention. The test administration device includes at least three substantially rigid planar members including a cover 1, a back 2, and one or more intermediate planar members 3. The cover, back, and one or more intermediate planar members are juxtaposed and rotatively interconnected on one lateral side 4 through a flexible binding 5 to form the test administration device.

Attached to the interior surface 6 of the cover 1 and to the interior surfaces 7 of the intermediate planar members 3, is a layer of material that is durable, yet cutable, and of sufficient thickness to retain the puzzle pieces in place. Cut-outs 8 in the general shape and thickness of the individual puzzle pieces 9 of the puzzle 11, are formed in the layer of material located on the interior surface of the cover. Similar cut-outs corresponding to the pieces 12 of other puzzle tests 13 are formed in the layers of material located on the interior surfaces 7 of the intermediate planar members.

The exterior surfaces 14 of the one or more intermediate planar members and the back 2 are generally smooth. When presenting the test subject with the puzzle subtests, these exterior surfaces provide integral work surfaces for the test subject to complete the respective puzzles.

Referring now to FIGS. 3A–3D, there is shown the operations performed in administering a test according to one embodiment of the present invention. The first step includes positioning the test administration device between the test subject and the administrator such that the exterior surface 15 of the cover 1 is facing upwards and the flexible binder 5 is facing the administrator. See block 16. As such, the puzzle pieces are concealed within the cut-outs formed in the interior surface 6 of the cover and the interior surfaces 7 of the one or more intermediate planar members 3. To administer the first puzzle 11, the administrator rotates the cover 1 vertically toward the administrator such that the pieces 9 dislodge from their corresponding cut-outs 8 and remain on the exterior surface 14 of the next planar member. See block 17. The exterior surface of the next planar member thus provides the test subject with an integral work surface.

Additionally, the random, predetermined arrangement represented by the cut-outs in the interior surface of the cover and the interior surfaces of the intermediate planar members allows the administrator to present each subject tested with the puzzle pieces arranged in substantially the same orientation each time. The orientation is substantially the same because the interior surface 6 of the cover 1 and the interior surfaces 7 of the intermediate planar members 3 are directly adjacent to the exterior surfaces 14 of the adjacent planar members, and thus the puzzle pieces are not required to fall to the work surface. This arrangement eliminates the possibility that the pieces change orientation upon contact with the work surface as might be the case where the pieces are required to fall to the work surface.

The administrator can rotate the cover 1 to a generally lower than vertical position, thus creating a rotatable shield that is integral with the test administration device 10. See block 18. Preferably, the shield is maintained at approximately 90°–135° with the horizontal. The shield provides the administrator with the ability to minimize distractions to the subject from the activities inherent in conducting psychological testing, such as timing the subject, writing notes, monitoring the subjects solution strategy, including the problems encountered and the methods used to solve the puzzles, and removal and storage of the completed puzzles.

Upon presentment of the first puzzle 11 by the administrator, the subject constructs the puzzle by correctly arranging the puzzle pieces 9 on the integral work surface 14 in the allotted time. See block 19. Once the puzzle pieces of the first puzzle have been arranged by the test subject or else the time for completing the puzzle has expired, the administrator will lower the cover 1 from the vertical position to a horizontal position. See block 20. In this position, the exterior surface 15 of the cover 1 is now facing downwards while the interior surface 6 containing cut-outs 8 is facing upwards and is positioned directly in front of the administrator.

To reveal the second puzzle 13, the administrator rotates the adjacent intermediate planar member 3 to a generally vertical position. See block 21. Again, the second puzzle is presented in a random, predetermined arrangement represented by the cut-outs located on the interior surface 7 of the intermediate planar member. As the administrator rotates the intermediate planar member, the pieces 9 of the first puzzle 11 slide down the exterior surface 14 of the now vertically positioned intermediate planar member and collect on the interior surface 6 of the cover 1. The interior surface of the cover is oriented directly in front of the administrator, thus enabling the administrator to conveniently and efficiently replace the pieces 9 from the first puzzle 11 in their corresponding cut-outs 8 while the subject completes the second puzzle 13. See block 22. Again, the administrator positions the interior planar member 3 in a generally lower than vertical position in order to create a shield to prevent distraction of the subject. Once the subject completes the second puzzle 13, the preceding puzzle 11 will have been deconstructed by the administrator and the pieces 9 returned to their corresponding cut-outs 8.

Once the pieces are replaced in the corresponding cut-outs, the administrator may then lower the intermediate planar member to a horizontal position overlaying the cover 1. See block 23. The pressure exerted on the interior surface 6 of the cover by the exterior surface 14 of the intermediate planar member securely stores the puzzle pieces 9 in their corresponding cut-outs 8. When the subject has completed the second puzzle or else the time allotted has expired, see block 24, the administrator then rotates the back 2 to the vertical position allowing the second puzzle 13 to slide down the back. The puzzle pieces 12 collect on the interior surface 7 of the intermediate planar member 3 located directly in front of the administrator. See block 25. The interior surface of the intermediate planar member contains the corresponding cut-outs for the puzzle pieces, thus allowing the administrator to efficiently and conveniently replace the pieces 12 from the second puzzle 13 in their corresponding cut-outs. See block 26.

If more than one intermediate planar member is provided, then the additional puzzles are administered sequentially. As discussed above, the subject completes the puzzle, while the administrator stores the pieces of the previous puzzle in their corresponding cut-outs. The administrator uses the rotatable intermediate planar members as a shield to minimize distraction to the subject. Upon completion of each puzzle, the administrator lowers the vertically positioned intermediate planar member so as to overlay the previous intermediate member and thereby securely store the preceding puzzle. To expose the next puzzle and deposit the completed puzzle test on the interior surface of the previous intermediate planar member, the administrator rotates the next intermediate planar member to the vertical position.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. An apparatus for administering psychological tests to test subjects, the apparatus comprising:

at least two test puzzles, each of said at least two test puzzles comprising a plurality of puzzle pieces;

at least three substantially rigid planar members, said substantially rigid planar members being rotatively interconnected on a common lateral side to form an integrated testing device, at least two of said substantially rigid planar members having a generally smooth exterior surface to thereby provide the test subject with at least two integral work surfaces for use in constructing said test puzzles; and at least two retaining layers, each of said retaining layers defining a plurality of cut-outs therein, each of said cut-outs corresponding to one of said plurality of puzzle pieces, each of said retaining layers being juxtaposed and attached to the interior surface of one of said substantially rigid planar members such that by consecutively rotating said substantially planar members said at least two test puzzles can be presented to a subject sequentially with said plurality of puzzle pieces corresponding to each of said at least two test puzzles arranged in a predetermined arrangement and wherein each subject tested is presented with said puzzle pieces in substantially the same arrangement.

2. An apparatus for administering psychological tests to test subjects as defined in claim 1 wherein at least two of said substantially rigid planar members comprise rotatable shields to minimize distractions to the test subject.

3. An apparatus for administering psychological tests to test subjects, the apparatus comprising:

at least two test puzzles, each of said at least two test puzzles comprising a plurality of puzzle pieces;

at least three substantially rigid planar members, said substantially rigid planar members being rotatively interconnected on a common lateral side to form an integrated testing device, at least two of said substantially rigid planar members comprising rotatable shields to minimize distractions to the test subject during administration of said test puzzles; and at least two retaining layers, each of said retaining layers defining a plurality of cut-outs therein, each of said cut-outs corresponding to one of said plurality of puzzle pieces, each of said retaining layers being juxtaposed and attached to the interior surface of one of said substantially rigid planar members such that by consecutively rotating said substantially planar members said at least two test puzzles can be presented to a subject sequentially with said plurality of puzzle pieces corresponding to each of said at least two test puzzles arranged in a predetermined arrangement and wherein each subject tested is presented with said puzzle pieces in substantially the same arrangement.

4. A method of conducting psychological testing comprising the steps of:

positioning in front of a test subject a psychological test administration device having at least two puzzle tests, each puzzle test having a plurality of puzzle pieces, at least three substantially rigid planar members being rotatively interconnected on a common lateral side to form an integrated testing device, the test administration device further having at least two retaining layers, each retaining layer being juxtaposed and attached to the interior surface of one of the substantially rigid planar members and defining a plurality of cut-outs therein, each cut-out corresponding to one piece of a puzzle test;

rotating a first substantially rigid planar member vertically to thereby expose the pieces of a first puzzle test on an integral work surface defined by the exterior surface of an adjacent second substantially planar member in a predetermined arrangement that is substantially the same arrangement as used for other test subjects;

rotating the adjacent second substantially rigid planar member after the subject has completed the first puzzle test to thereby collect the pieces of the completed first puzzle test on the exterior surface of the retaining layer attached to the interior surface of the first substantially rigid planar member;

placing the pieces of the completed first puzzle test in the corresponding cut-outs defined by the retaining layer attached to the interior surface of the first substantially rigid planar member; and storing the pieces of the first puzzle test in the corresponding cut-outs defined by the retaining layer attached to the interior surface of the first substantially rigid planar member by overlaying the adjacent second substantially rigid planar member.

5. A method of conducting psychological testing as defined in claim 4 further comprising the step of maintaining a substantially rigid planar member in a position generally lower than vertical to thereby create a rotatable shield to minimize distractions to the test subject.

6. A method of conducting psychological testing as defined in claim 4 further comprising the step of monitoring the elapsed time as the subject constructs the puzzle test.

7. A method of conducting psychological testing as defined in claim 4 further comprising the step of repeating said first and second rotating steps and said placing and storing steps until all the puzzle tests have been administered.

8. A method of conducting psychological testing as defined in claim 4 further comprising the step of monitoring the solution strategy of the test subject.

9. An apparatus for administering psychological tests to test subjects as defined in claim 1 wherein at least one of said at least two test puzzles is configured in the shape of an automobile.

10. An apparatus for administering psychological tests to test subjects as defined in claim 1 wherein at least one of said at least two test puzzles is configured in the shape of a person.

11. An apparatus for administering psychological tests to test subjects as defined in claim 1 wherein said at least two test puzzles correspond to the Object Assembly Subtest of the Weschsler Intelligence Scale for Children.

12. An apparatus for administering psychological tests to test subjects as defined in claim 1 wherein said at least two test puzzles correspond to the Object Assembly Subtest of the Weschsler Adult Intelligence Scale.

13. An apparatus for administering psychological tests to test subjects as defined in claim 1 wherein said at least two test puzzles correspond to the Object Assembly Subtest of the Weschsler Preschool and Primary School Scale of Intelligence.

14. An apparatus for administering psychological tests to test subjects as defined in claim 3 wherein at least one of said at least two test puzzles is configured in the shape of an automobile.

15. An apparatus for administering psychological tests to test subjects as defined in claim 3 wherein at least one of said at least two test puzzles is configured in the shape of a person.

16. An apparatus for administering psychological tests to test subjects as defined in claim 3 wherein said at least two test puzzles correspond to the Object Assembly Subtest of the Weschsler Intelligence Scale for Children.

17. An apparatus for administering psychological tests to test subjects as defined in claim 3 wherein said at least two test puzzles correspond to the Object Assembly Subtest of the Weschsler Adult Intelligence Scale.

18. An apparatus for administering psychological tests to test subjects as defined in claim 3 wherein said at least two test puzzles correspond to the Object Assembly Subtest of the Weschsler Preschool and Primary School Scale of Intelligence.

* * * * *